United States Patent [19]

Huet

[11] 4,364,178

[45] Dec. 21, 1982

[54] NUMERICALLY CONTROLLED MEASURING DEVICE

[75] Inventor: Alain Huet, Buc, France

[73] Assignee: Societe d'Etudes Industrielies de Villejuif, Seiv Automation, Ris-Orangis par Evry, France

[21] Appl. No.: 159,077

[22] Filed: Jun. 13, 1980

[30] Foreign Application Priority Data

Jun. 13, 1979 [FR] France ............................. 79 15194

[51] Int. Cl.³ .............................................. G01B 7/02
[52] U.S. Cl. ................................. 33/174 L; 33/174 PC
[58] Field of Search .................. 33/1 M, 23 K, 172 E, 33/174 L, 174 PC, 174 P, 174 PA

[56] References Cited

U.S. PATENT DOCUMENTS

| | | | |
|---|---|---|---|
| 3,766,653 | 10/1973 | McKay, Sr. | 33/174 L |
| 3,824,893 | 7/1974 | Sartorio | 33/23 K |
| 3,991,477 | 11/1976 | Zipin et al. | 33/174 L |
| 4,053,989 | 10/1977 | Yamaji e al. | 33/174 PC |
| 4,084,323 | 4/1978 | McMurtry | 33/174 L |
| 4,130,941 | 12/1978 | Amsbury | 33/174 L |
| 4,177,568 | 12/1979 | Werner et al. | 33/174 L |

FOREIGN PATENT DOCUMENTS 139454  1/1980  Fed. Rep. of Germany .... 33/172 E

Primary Examiner—Richard R. Stearns
Attorney, Agent, or Firm—Beveridge, DeGrandi & Kline

[57] ABSTRACT

A coordinate measuring machine includes a head which is movable along X, Y and Z coordinate axes, a plate supported by the head, and a probe which is supported by the plate. The probe is movable relative to the plate along X and Y axes, and it has a work-contacting idler roller. An electronic calculator receives signals indicating the location of the head and the location of the probe relative to the plate, and provides an output of the coordinate locations of points of contact between the roller and a workpiece. The plate is supported on the head by three balls positioned in radial grooves. The movement of the head is automatically stopped in response to any separatory movement between the plate and the head.

11 Claims, 7 Drawing Figures

NUMERICALLY CONTROLLED MEASURING DEVICE

The invention concerns numerically controlled measuring devices, particularly for the determination of curves and surfaces.

Measuring devices are known in which the past to be measured is disposed on a block while a member of the machine is capable of being displaced along three rectangular coordinate axes in relation to this block, this member acting as a support for a probe which is brought into contact with the part to be measured.

To determine the level Z at a point of the part defined by two coordinates, X, Y, the probe support is placed outside the surface of the part at a point of coordinate X, Y, and displaced axially in direction Z, the probe being fixed on the support in such a way that the probing member is itself movable in direction Z in relation to the support, and displacement is continued until the probe has detected a recess. The desired level Z is then obtained, either by resetting the probe indication to zero, or by finding the difference between the level Z of the support and the value of the recess detected by the probe. To measure a curve, one operates thus point by point, withdrawing the probe each time and changing the value of one of the coordinates X or Y. To measure a surface, one operates in the same way, but varying the two coordinates X and Y to explore the whole in a network of points. This method is extremely long and does not allow accomplishment of the dense network of points which would be required by optimum precision in determination of the curve or surface.

It is the object of the invention to improve considerably the precision and speed of measurement due to continuous advance of the probe over the part.

For this, the device for displacement along three axes, constituting the base itself of the machine, is not modified, and only the probe mounted on the support and the mode of control of displacements of the machine are modified.

The invention therefore consists in adapting on the machine of known type ensuring displacement of the probe support, a probe exhibiting the following characteristics:

(a) its probing member is a rotary disc or roller mounted for idle rotation about an axis perpendicular to the plane of the curve measured or of one of the sectional curves of the surface to be measured;

(b) this roller axis is mounted so as to be capable of being displaced freely in translation relative to the support in two directions perpendicular to each other and to this axis and corresponding to two of the directions of displacement of the support on the machine, these two relative displacements being detected separately each by an appropriate measuring pick-up;

(c) this roller axis is provided with a perceptibly isotropic centripetal multidirectional elastic return means constantly returning it to a mean central position considered as the axis of the probe support.

Moreover, the whole assembly described above may advantageously be fixed on a plate mounted in relation to the support in a manner which is geometrically fixed but capable of yielding in case of the permitted forces being exceeded and of actuating in this case a device for stopping the machine.

On the other hand, the invention consists in providing the assembly with an electronic calculator receiving the data of the absolute coordinates X, Y, Z of the support on the machine, X and Y corresponding to the two directions of the curve measured, the two relative coordinates x, y of the probe axis in relation to the support axis supplied by the two abovementioned pick-ups, and possibly the alarm signal actuated by the release plate, and providing the desired orders for control of the three absolute displacement movements of the machine and their possible stopping. For this, this calculator effects the following determinations:

(a) in the case of a measuring point on a concave or convex surface, it produces displacement along one at least of the coordinates X and Y until the said pick-ups have detected a recess starting from the zero position. Displacement is then stopped and as a function of the corresponding values X and Y, x and y, the calculaor effects calculation of the direction of the normal, the position of the centre of the roller and the position of the point of contact at the intersection of this normal and the circle representing the roller.

(b) for measurement of a curve, the calculator departs from three calculated positions of the roller axis to determine by extrapolation calculation a fourth probable position as a function of a given rate of advance, preferably decreasing at the same time as the radius of curvature, then to plot, starting from this probable point in the direction of the given normal to the third point and in the direction of the part, an arbitrary length which is a fraction of the latitude of relative displacement of the roller axis in relation to the probe support axis, and finally controls the displacements to bring this probe support axis by variation of X and Y to this calculated point in order to determine the actual position of the fourth roller centre, the same process being repeated each time with the last three positions of this centre.

(c) for measurement of a surface, the above process is repeated for various values of Z, using in this case preferably a toric edge with small radius for the roller and taking into account the inclination of the surface in the direction Z to calculate the actual level of the point of contact of this toric surface with the surface to be measured.

Other characteristics of the invention will appear in the description which is to follow of an embodiment taken as an example and shown in the attached drawings.

Figure 1:
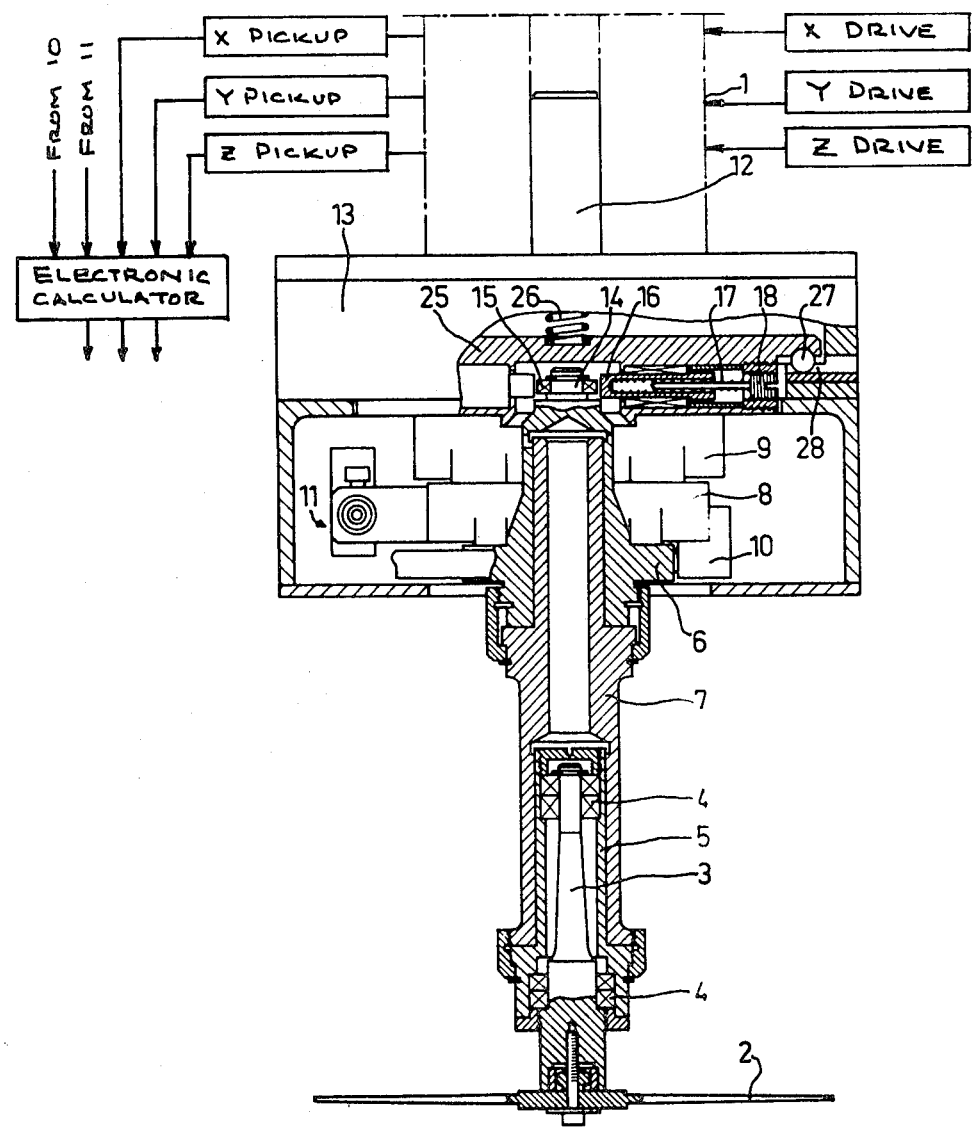
FIG. 1 is a partial vertical section of the probe device.
Figure 2:
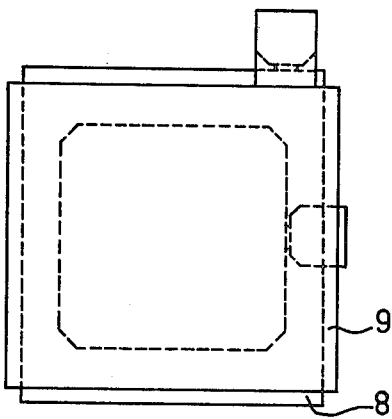
FIG. 2 is a plan view of the double sliding table device.

The usual portion of the machine, comprising the block receiving the part and the devices for guiding displacement along the three coordinate axes X and Y and Z of the probe support, has not been shown, and only the lower end 1 of this support appears in FIG. 1.

According to the invention, the probing member properly speaking consists of a rotary disc 2 or roller rotating idly about its axis. This roller is for example fixed to the cantilever end of a spindle 3 pivoting freely on precision bearings 4 within a bearing bush 5. The cantilever length of the projection lower end of the spindle 3 may be more or less significant according to needs, in the same way as the diameter of the roller 2 as will be seen subsequently, and further the bearing bush may be mounted directly in the bore of a base 6 or indirectly by means of an extension 7 visible in FIG. 1.

According to a second characteristic of the invention, this base 6 is mounted on a first sliding table 8 itself mounted on a second sliding table 9, the directions of sliding of the two tables being perpendicular to each other and perpendicular to the axis of the spindle 3. The axis of this spindle corresponds to one of the three directions of displacement of the support 1, which will be designated hereinafter direction Z, and further the directions of sliding of the two tables 8 and 9 correspond respectively to the directions X and Y. In the example chosen in FIG. 1, this axis Z is assumed vertical, but in a variant corresponding to FIG. 4 this axis Z may equally be horizontal. On the other hand, each sliding table 8 and 9 comprises an associated displacement pick-up, respectively 10 and 11, detecting respectively the relative coordinates x and y of the roller axis in relation to the axis of the shank 12 for fixing the head of the probe 13 on its support 1. The amplitude of displacement of the tables and pick-ups is of course somewhat reduced, for example to the extent of plus and minus 7 mm.

Figure 3:
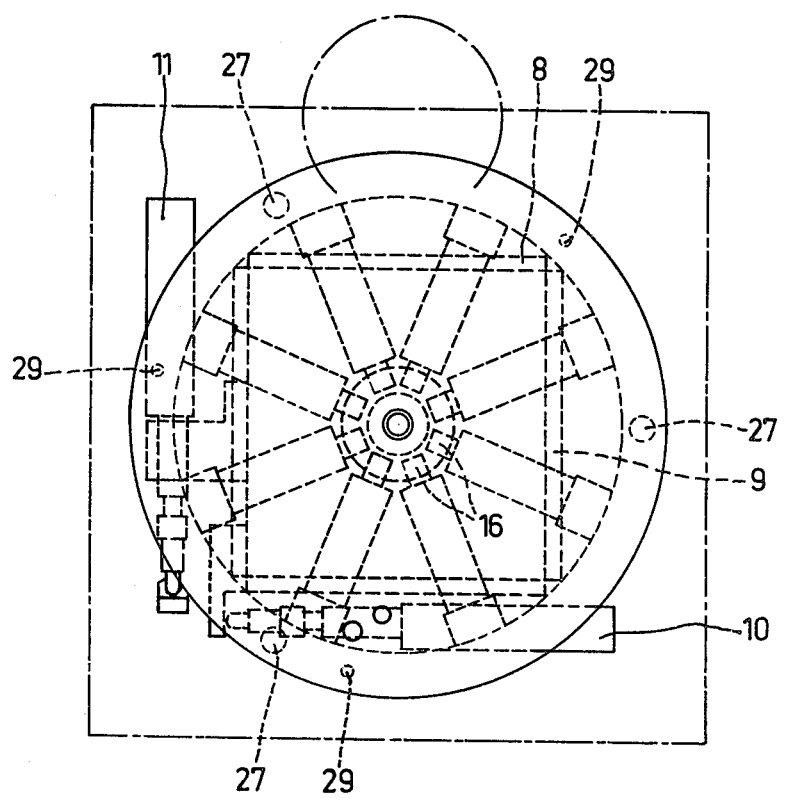
FIG. 3 is a view from above of the probe assembly.

According to a third characteristic of the invention, the base 6 comprises a perceptibly isotropic centripetal multidirectional elastic return device. For this there is arranged, for example at the upper end 14 of the extension of the base 6 in which is centred the bush 5 or corresponding part of the extension 7, a bearing 15 on which act a certain number of spring tappets 16, for example eight in number distributed all around the axis as shown in FIG. 3, each of these tappets sliding in the radial direction, constantly biassed towards the centre by a spring 17 with an adjuster screw 18. The assembly is thus regulated and balanced so that the axis of the rollers 2 coincides at rest with a fixed position which will be assumed to be the axis of the shank 12.

Figure 4:
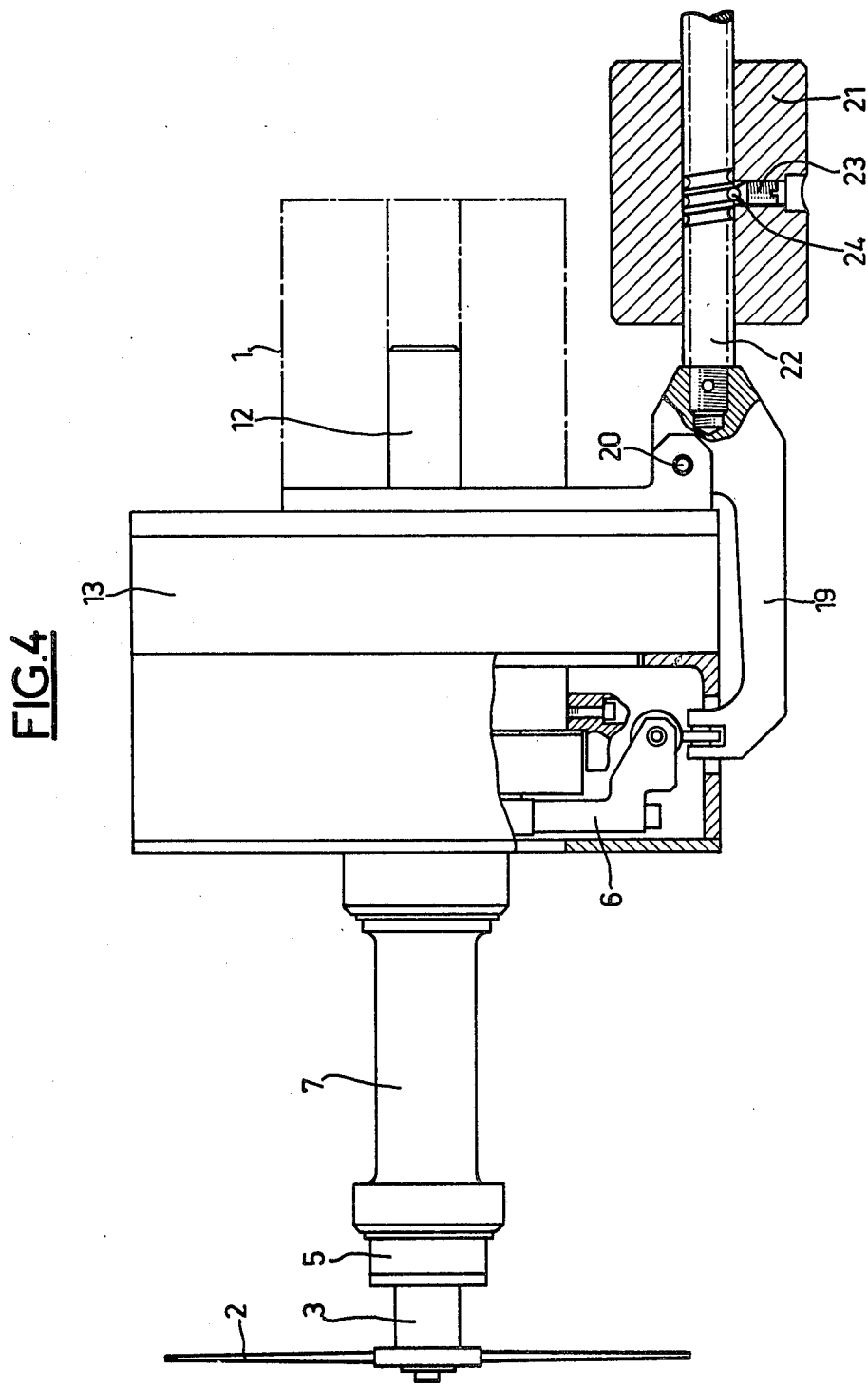
FIG. 4 shows a variant of usage in the case where the axis Z is horizontal.

In the event that the probe is used with its axis not vertical, for example horizontal as in the example shown in FIG. 4, it is further necessary to provide compensation for the weight of the moving portion, which is obtained simply by means of a beam 19 articulated at 20 on the probe head 13 and comprising a weight 21 adjustable in position along the threaded portion 22 extending the beam 19 to the rear, with locking by a screw 23 acting on a ball 24 which acts as a nut. The assembly, at first balanced in a vertical position by action on the screws 18, is then placed horizontally and rebalanced by adjustment of the weight 21.

According to the invention, the assembly of base table 9 as well as supports for the spring tappets 16 is not fixed directly on the probe head 13, but is fixed on a plate 25 which is biased by an axial spring 26 into abutment against the head 13, this abutment being effect by means of three balls 27 distributed at 120° over the edge of the lower face of the plate and each supported in a radial groove 28 for example in a V. This device therefore ensures precise immobilization of the plate in relation to the head 13 while allowing disengagement in case of both axial and transverse excessive force. Further, three microcontacts designated 29 in FIG. 3 and interposed between the balls 27, detect any separation between the plate 25 and head 13 in order to stop the machine in the event of the device enduring abnormal stress.

Moreover, according to the invention, the assembly which includes the conventional machine with displacements X, Y, Z and the probe which has just been described, is completed by associated electronic means allowing, as a function of the results found, control of displacements X, Y and Z to be ensured and display of the desired result, as a function of numerical information from the pick-ups of X, Y and Z displacement of the machine and x, y of the probe.

Figure 5:
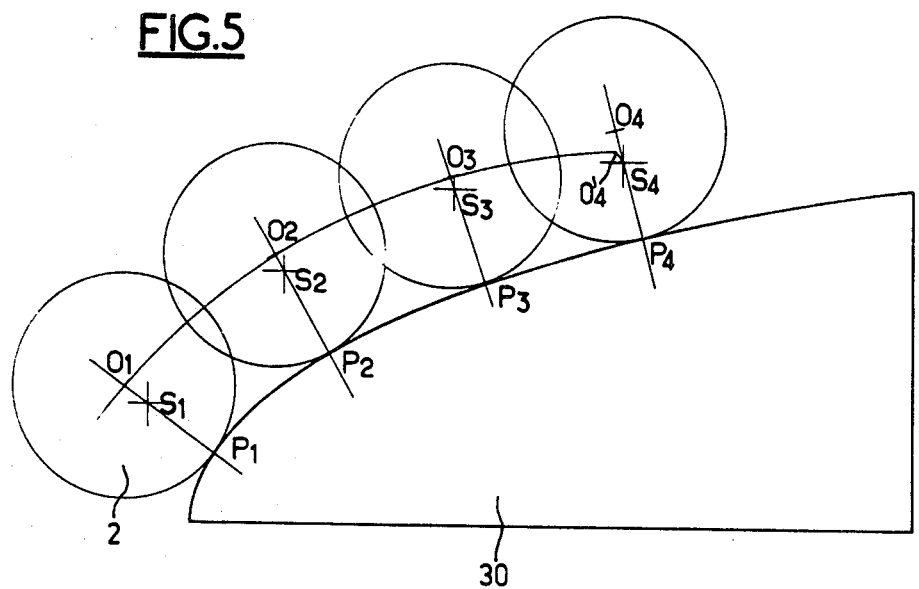
FIG. 5 shows a fundamental diagram for functioning of the calculator.

To measure any point P1 of a part 30 (see FIG. 5) with single or double curve, convex or concave, the support 1 is displaced along Z until the roller 2 is at the level of point P1, then in the plane X, Y (which is the plane of FIG. 5) this support is displaced, realized in FIG. 5 by point S1 representing the projection of the axis of the support 1 or of the shank 12 of the head 13 mounted in this support, this being in the direction of P1 until the pick-ups 10 and 11 or at least one of them indicate different values of zero for x and y. The coordinates of S1 are at this moment X, Y and Z. Displacement can then be stopped and the position of point P1 deduced by calculation. In fact, the idle mounting of the axis 3 permits the assumption that there is no torque on the roller 2 and that consequently the reaction force of the part 30 at P1 on the roller 2 is applied radially along P1O1 and represents the projection of the axis 3 for this position of the roller. On the other hand due to centripetal elastic return, it can be affirmed that the elastic force imparted by the device to the axis O1 is radial in relation to S1, that is, directed along O1S1, and this force balances the above reaction force.

From X, Y, absolute coordinates of S1 and x, y, relative coordinates of O1 in relation to S1, are easily deduced the absolute coordinates of O1 which are respectively $X+x$ and $Y+y$. To obtain the coordinates P1 therefore it is sufficient, from the coordinates of O1, to plot a vector O1P1 of known modulus, equal to the radius of the roller, and in the known direction of which the direction coefficients are respectively $-x$ and $-y$ related to the modulus of S101, that is $\sqrt{x^2+y^2}$. The calculator associated with the machine can therefore display directly the three coordinates of the point P1.

In the event that it is desired to measure a curve, defined for example by a cylindrical surface with generating lines parallel to the axis Z, one can work point by point using the above method, but it is quicker and more precise to work in the following manner:

After being positioned at Z, the support is displaced successively into three positions S1, S2 and S3, in actual fact very close together, at a certain rate of progression, this being by manual control. For each of these positions, as before the absolute coordinates of the positions O1, O2 and O3 which are occupied successively by the axis 3 of the roller 2 are determined; these three items of information then provide the direction to be followed as well as the curvature of the surface and allow calculation of the probable position O'4 of the following centre. For this, on the one hand an extrapolation curve is determined, passing through the points O1, O2, O3, for example a circle or a conic, or else a cubic by setting the direction of the tangent at O1 which at the beginning is calculated as perpendicular to the normal defined as above, then for the following points is calculated as tangent to the above extrapolation curve. On the curve thus defined on the other hand, point 0′4 is selected in such a way that the rate of advance 03, 0′4 corresponds to a value which is arbitrary but preferably decreasing with the radius of curvature to ensure better definition in the very curved portions of the part 30.

From point 0′4 calculated thus is plotted a segment of a straight line 0′4S4 of which the direction is taken as parallel to the normal 03P3 to the extrapolation curve and in the direction indicated, and of which the length corresponds to a standard value which is a fraction of the margin of deflection of the sliding tables 8 and 9. For example in the example chosen, where this deflection is of the order of plus and minus 7 mm, this standard value may be equal to 2 mm.

Having determined the coordinates of the point S4, they are transmitted to the control mechanism for displacement X and Y to bring the support to this point, and the actual position of point 04 is determined as above. The latter may be further from the surface of the part 30 than the point 0′4 provided, as in the example shown in FIG. 5, or on the contrary closer to this surface, that is comprised between 0′4 and S4. The standard value of proximity 0′4S4 indicated above in this case has precisely the effect of avoiding loss of contact between the roller and the past. In other words, the actual compression of the multidirectional elastic device is in practice greater or smaller as the case may be, than the standard value of proximity set but always in the same direction, which allows loss of contact to be avoided, precisely due to the slowness of the rate of advance and further to the reduction in this rate when the radius of curvature decreases as indicated above, which constitutes supplementary reliability.

From that moment on, the calculator takes into account the coordinates of 04 or P4 calculated and registers them or uses them for the purposes of comparison. Then the calculator proceeds from the coordinates of the points 02, 03 and 04 to operate in the same way with the following position 05 and so on.

Finally therefore, the roller never leaves the surface to be measured and is displaced by rolling continuously along this surface by quasicontinuous servo control, the time intervals corresponding to the different rates of advance being in fact limited only by the speed of calculations and not by mechanical displacements. There results the possibility of exploring with extreme precision a given surface in a reduced time with a much higher number of points measured than with conventional devices. For instance one can easily manage to obtain 9 to 10,000 points an hour whereas with conventional devices 1,000 is rarely exceeded in exceptional conditions.

Figure 6:
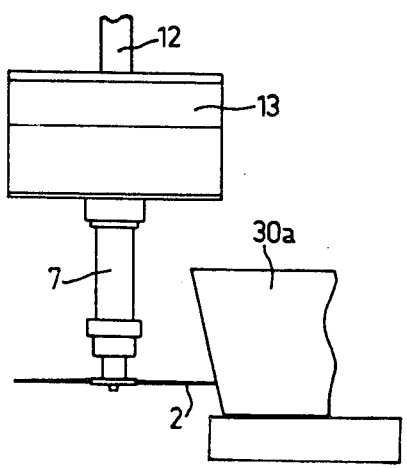
FIG. 6 is an elevation of the above assembly used for measurement of an undercut skew surface.
Figure 7:
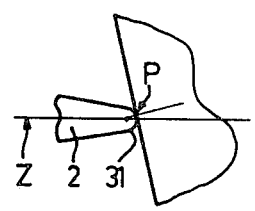
FIG. 7 is an enlarged view of a fragment of the above figure at the site of contact.

In the event that it is desired to measure any surface, procedure is as above for successive values of the level Z. In this case, and in particular if the part 30a exhibits an undercut surface as illustrated in FIG. 6, it is important, to avoid collision between the part 30a and the probe head 13, for the roller 2 to have a large enough diameter and for the shaft 3 or extension 7 to have a long enough length. Moreover according to the invention the extreme edge of the roller, as appears in the enlarged view of FIG. 7, preferably has a toric profile 31 with small radius but perfectly defined rather than a sharp portion which is imprecise and subjected to wear. The value of the radius of this toric portion is then taken into account in the calculator which, for each point of contact P measured at an approximate level Z, derives from its memory the values of the coordinates of the homologous point at the preceding level to calculate the inclination in relation to the axis Z of the generating line of the surface if occasion arises, or of the tangent to this surface, in order to calculate the correction to be made to Z to have the actual position along Z of the point P of contact between this straight line and the torus 31. In this case of course it is a question of a very small correction but one which may however not be negligible, taking into account the precision of the apparatus.

Naturally in the case of exploration of a surface, by successive level curves, the speed of measurement is even more important than in the above case.

All the above supposes to be known the position of the part in relation to the block, the variable absolute level Z and the constant relative level z of the roller in relation to the support. To avoid determination of all these levels, accumulation of tolerances and the usual problems of determination of zero, procedure as follows is provided according to the invention:

A reference sphere is used of precise known diameter connected to the part measured at a precise known level Z in relation to the plane of reference of the part.

Before each measurement, or series of measurements made as explained above, or after each change of roller, if any, the probe is moved to an abritrary level corresponding to a small circle in the upper hemisphere of the sphere (supposing the axis of Z to be vertical), and several points of this sphere are measured, then the probe is moved to another arbitrary level corresponding to a small circle of the lower hemisphere and several points of this circle again are measured. Calculation then permits determination with precision of the shifting of zero, that is, exact location of each subsequent level Z of the probe in relation to the plane of reference, eliminating all other unknowns. Of course, corresponding calculations are effected automatically by the calculator of the machine.

The applications of this device are countless. In particular, proceeding from a typical model part, the levels and coordinates of the various points can be determined and registered in the memory with the object for example of controlling a numerical machine tool producing parts according to the typical part. Inversely the same machine allows, on a newly made part, checking of the accuracy of the levels and coordinates of the various points by comparing them with the coordinates supplied either by mathematical definition of the surface, or by prior recording on a typical part obtained as has just been explained.

I claim:

1. A numerically controlled coordinate measuring machine, comprising, part-support means for supporting a part to be measured, a probe, a plate supporting said probe, a head supporting said plate, means supporting said head and said part-support means for relative movement along three coordinate axes, drive means for providing relative movement between the part-support means and the head, said probe having an idler roller for contacting a part being measured, said probe being rotatable about a roller axis which is aligned with one of the coordinate axes, said probe being supported for movement relative to said plate in two mutually perpendicular directions which are perpendicular to the roller axis and correspond to two of said coordinate axes, elastic return means supported on the plate for biasing the roller axis toward a given position relative to the plate, two measuring pick-ups for sensing the distance measured along said two directions between the roller axis and said given position, electronic calculator means for receiving signals from the measuring pick-ups and the coordinates which indicate the location of the head relative to the part-support means and for calculating coordinate locations of points of contact between the roller and the part being measured, said plate being biased against said head by an axial spring and supported on the head by three balls positioned in three radial grooves, means for detecting any separatory movement between the plate and the head to stop the machine when said separatory movement occurs.

2. The apparatus of claim 1 wherein the probe roller is a disc which has a toric external profile of precise radius, said apparatus being provided with a plurality of such discs which are interchangeable on said probe.

3. The apparatus of claim 1 wherein the probe includes a bearing bush and an extension which carries the roller and is received in said bush.

4. The apparatus of claim 1 having a balance counterweight means which exerts an upward counterbalancing force on said probe when the roller axis lies in a direction other than vertical.

5. The apparatus of any of of claims 1, 2, 3, or 4 wherein, for determination of the coordinates of an isolated point, the calculator means proceeds from the absolute rectangular coordinates of the support and the relative rectangular coordinates of the roller axis to determine the absolute coordinates of the point of contact of the roller with the part being measured.

6. The apparatus of claim 5 wherein the calculator means preliminarily gauges to determine zero of a level Z from measurements made by the probe on several points of two small circles situated respectively in opposite hemispheres of a reference sphere of precise known diameter situated at a precise knwon level in the direction of Z in relation to the plane of reference of the part measured.

7. The apparatus of any one of claims 1, 2, 3 or 4 wherein, for exploration of a curve oriented in the plane of two of the coordinate axes, the calculator means proceeds from the calculated position of three successive roller centers to determine by calculation the most probable following position at a rate of separation decreasing at the same time as the radius of curvature of the curve, and determines the new coordinates to be prescribed for the support by approaching, starting from this most probable position, a standard level in the direction of the normal to the curve described by the roller center at the position of the preceding point, the said standard value being selected as a fraction of minimum displacement of the probe from the given position in said two mutually perpendicular directions, and finally after receiving the information relating to the new position of the probe and calculating the new coordinates of its center, it repeats the operation each time with the last three centers.

8. The apparatus of claim 7 wherein the calculator means preliminarily gauges to determine zero of a level Z from measurements made by the probe on several points of two small circles situated respectively in opposite hemispheres of a reference sphere of precise known diameter situated at a precise known level in the direction of Z in relation to the plate of reference of the part measured.

9. The apparatus of claim 7 wherein, to explore a surface, the calculator repeats exploration of a curve for successive values of the third coordinate, calculating in each case the level correction to be made in the direction of this third coordinate as a function of the known radius of curvature of the toric portion of the roller and the inclination of the surface at the point considered in relation to the third coordinate axis, the inclination being calculated as a function of the levels of homologous points obtained in exploration of the preceding levels.

10. The apparatus of claim 9 wherein the calculator means preliminarily gauges to determine zero of a level Z from measurements made by the probe on several points of two small circles situated respectively in opposite hemispheres of a reference sphere of precise known diameter situated at a precise known level in the direction of Z in relation to the plane of reference of the part measured.

11. A method of measuring an object with a coordinate measuring machine which has a head which is movable along coordinate axes, and a probe which is supported on said head and is movable relative thereto along coordinate axes, said method comprising the steps of
(a) determining the coordinate locations of three adjacent positions of the probe where it contacts an object being measured;
(b) moving the head to a next location in a direction conforming to an extrapolated curve which is based on and includes the coordinate locations of said three adjacent positions;
(c) determining the coordinate location of the probe when in contact with the object when the head is at said next location; and
(d) moving the head forwardly, successively repeating steps (b) and (c) using as one of the three adjacent positions in step (b) the coordinate location ascertained from the preceding performance of step (c).

* * * * *